Oct. 11, 1966 E. CZOK ET AL 3,278,755

LOGIC GATE WITH REGULAR AND RESTRAINING INPUTS

Filed Dec. 11, 1961 3 Sheets-Sheet 1

INVENTORS
Erhard Czok &
Salomón Klaczko-Ryndziun

BY George H. Spencer
ATTORNEY

INVENTORS
Erhard Czok &
Salomón Klaczko-Ryndziun

BY George H. Spencer
ATTORNEY

LOGIC GATE WITH REGULAR AND RESTRAINING INPUTS
Filed Dec. 11, 1961 3 Sheets-Sheet 3
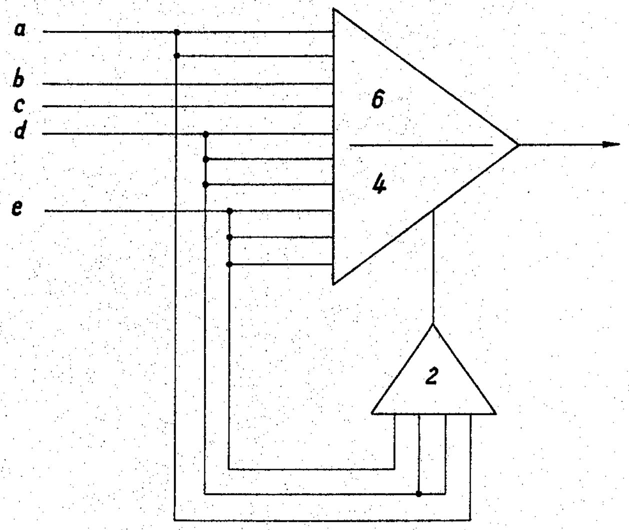
Fig.6
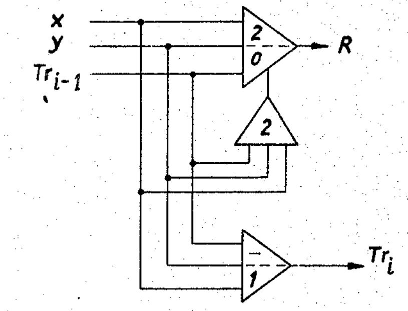
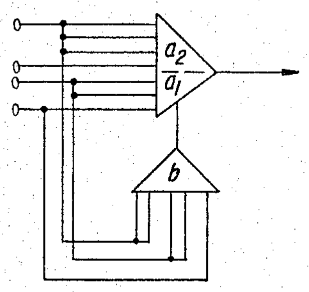
Fig.7 Fig.8
INVENTORS
Erhard Czok &
Salomón Klaczko-Ryndziun
BY George H. Spencer
ATTORNEY United States Patent Office 3,278,755

Patented Oct. 11, 1966

3,278,755

LOGIC GATE WITH REGULAR AND RESTRAINING INPUTS

Erhard Czok and Salomón Klaczko-Ryndziun, Konstanz, Germany, assignors to Telefunken Patentverwertungs-G.m.b.H., Ulm (Danube), Germany Filed Dec. 11, 1961, Ser. No. 158,436
Claims priority, application Germany, Dec. 20, 1960, T 19,445
15 Claims. (Cl. 307—88.5)

The present invention relates generally to the computer art, and more particularly to logical circuits for use in computers.

In order to perform numerical computations and logical calculations, especially in electronic computers, logical networks or circuits are used which are also known as logical elements, logic gates, and logic stages. Known networks or circuits of this type are AND-gates, OR-gates, and inverters (NOT function), as well as other circuits having exclusive OR-functions, Sheffer-Stroke functions, etc., which are related to one another and to the first-mentioned circuits according to the rules of Boolean Algebra. Such circuits may be constructed with various means, such as diodes, transistors, magnetically reversible elements, or excitable elements of the parametric type.

One trend in designing logic circuits or stages is to adapt such circuits to handle more complex logical operations, for the purpose of simplifying the devices into which such circuits are incorporated, as well as to provide more rapid operation of the entire logical network. The principle of multiple descision has been especially used in the parameter circuit art wherein a network may have a set threshold value which can only be overcome by exciting a definite number of inputs. Thereupon, the output signal of the network will change.

It is also known to provide inhibiting input lines in the form of opposed windings in magnetic cores, which may also be set to have a threshold value so that only after the threshold has been overcome will a reversal of the magnetism of the core take place. The level of this threshold value is dependent upon the number of inhibiting windings which are excited at any given time.

A main object of the present invention is to provide a simple logical network using the principle of particle inhibition and threshold values having multiple logical functions in which the known connections mentioned above may also be realized in a simple manner.

Another object of the invention is to provide a circuit of the type described wherein a large number of logical functions may be performed with relatively simple circuitry.

These objects and others ancillary thereto are accomplished according to preferred embodiments of the invention, wherein the following features are provided either individually or in any combination thereof:

(a) A threshold type circuit has a number of partial inhibiting or restraining input lines and regular input lines wherein a change of output will occur only when a threshold value is surpassed by exciting or activating a certain number of regular inputs with the circuit being arranged so that the threshold value is independent of the number of restraining input lines.

(b) A threshold type circuit having a number of restraining and regular or exciting inputs will have an output only when a threshold value is surpassed by exciting or activating a certain number of regular inputs, wherein the circuit is arranged to have two threshold values only one of which is present at any one instant, and which are dependent upon activation or excitation of at least one of the restraining input lines.

(c) A threshold type circuit has at least one restraining input line connected with a regular input line to form a common circuit input.

In this type of network, extensions or expansions of the logical functions are obtainable by providing that the thresholds are variably adjustable as well as that individual logical inputs become active in several regular inputs and/or in several restraining input lines.

Additional objects and advantages of the present invention will become apparent upon consideration of the following description when taken in conjunction with the accompanying drawings in which:

FIGURE 1*a* is a circuit diagram of one embodiment of the present invention.

FIGURE 1*b* is a circuit diagram of another embodiment of the present invention.

FIGURE 6 is a block diagram of another connection for the circuit of FIGURE 2.

FIGURE 7 is a block diagram of still another connection for the circuit of FIGURE 2.

FIGURE 8 is a block diagram of yet another connection for the circuit of FIGURE 2.

Figure 1A:
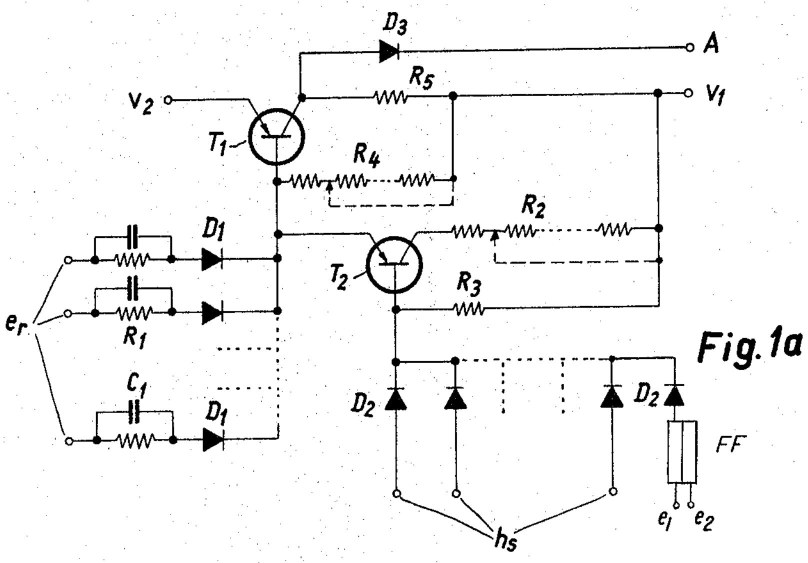

With more particular reference to the drawings, FIGURE 1*a* illustrates a circuit wherein D.C. voltages $V_1$ and $V_2$ are applied to the correspondingly designated terminals $V_1$ and $V_2$, with $V_2$–$V_1$ being assumed to be positive and equal to approximately +10 volts. A p-n-p transistor $T_1$ is provided having its emitter connected to $V_2$ and its collector connected to $V_1$ via resistor $R_5$. The base of this transistor is also connected to $V_1$, but through a series of rheostats or resistors $R_4$ so that it may draw current through these resistors in order to place transistor $T_1$ into the conducting condition up to the saturation region and keep it operating. A number of regular or exciting inputs $e_r$ are provided in parallel and are connected to a plurality of diodes $D_1$ via resistors $R_1$, so that the cathode of these diodes are dispersed at the base of transistor $T_1$. Capacitors $C_1$ are connected in parallel with resistors $R_1$ in order to expedite switching.

When regular inputs $e_r$ are not excited they have a low potential which may be equal to a O signal, which is less than $V_1$, so that the diodes $D_1$ which are connected in parallel are reverse biased, or biased in the backward direction. If a more positive potential, such as a potential equal to a signal L, is applied to one or several of the regular inputs, then the diodes $D_1$ may be forward biased and conduct so that the base potential for transistor $T_1$ will be increased to the point where transistor $T_1$ is cut off. The threshold value at which this occurs may be varied in stepwise manner by effectively connecting individual resistors $R_4$ into or out of the circuit in any desired manner, for example, by using the adjustable tap shown in dashed lines. If this threshold value is exceeded and transistor $T_1$ is cut off, the output A, which is connected to the collector of this transistor, will change from a higher potential equal to a O signal to a lower potential equal to an L signal. Diode $D_3$ is connected in the output line and serves for decoupling purposes when the output A is connected with other network elements.

The above described condition is true as long as the second transistor $T_2$ is cut off. This transistor $T_2$ is connected in parallel with resistors $R_4$, between $V_1$ and the base of transistor $T_1$. A series of rheostats or resistors $R_2$ are provided between $V_1$ and the collector of transistor $T_2$ in this parallel connection. It will now be assumed that all the regular inputs $e_r$ are set at signal O. If the transistor $T_2$ is conducting, then transistor $T_1$ will be controlled into the conducting condition with greater base current by means of resistors $R_4$ and $R_2$, and also via the resistor $R_3$ which will be discussed further below. When this occurs a second and higher threshold value is set which must be overcome by a more positive potential from the regular inputs $e_r$ in order to cut off the transistor $T_1$ to bring about an output signal of L in the output A. This threshold value may also be varied in stepwise manner by connecting resistors $R_2$ into or out of the circuit in any desired manner, for example, by using the adjustable tap shown in dashed lines.

In order to place the transistor $T_2$ into the conducting condition, the potential normally appearing at its base, which has a more positive blocking level or effect, must be sufficiently lowered. This may be accomplished through a control input which may, for example, be a flip-flop, which represents a restraining input line. When a restraining input line becomes active it switches to a different or higher threshold value. However, the arrangement is preferably such that several restraining input lines $h_s$ become active in a suitable interconnection or arrangement for controlling the transistor $T_2$.

In FIGURE 1*a* the base of transistor $T_2$ is connected to voltage $V_1$ via resistor $R_3$. The cathodes of *n* number of diodes $D_2$ are connected to the base of this transistor, with the anodes of these diodes being connected to the restraining input lines $h_s$. The arrangement is such that, for the restraining input lines a O signal is a more positive voltage, i.e., greater than $V_2$, and a signal equal to L is a more negative voltage by means of which the diodes $D_2$ may be backward biased. As long as at least one of the restraining input lines has a O signal, the base of transistor $T_2$ will be at a sufficient positive potential to keep the transistor blocked. The base of the transistor $T_2$ will receive this potential via a diode $D_2$. Only when a more negative potential equal to signal L appears at all of the restraining input lines $h_s$, may the base of transistor $T_2$ draw current through resistor $R_3$ to place the transistor into the conducting condition. Thus, the restraining input lines $h_s$ become active as an AND- function.

Figure 1B:
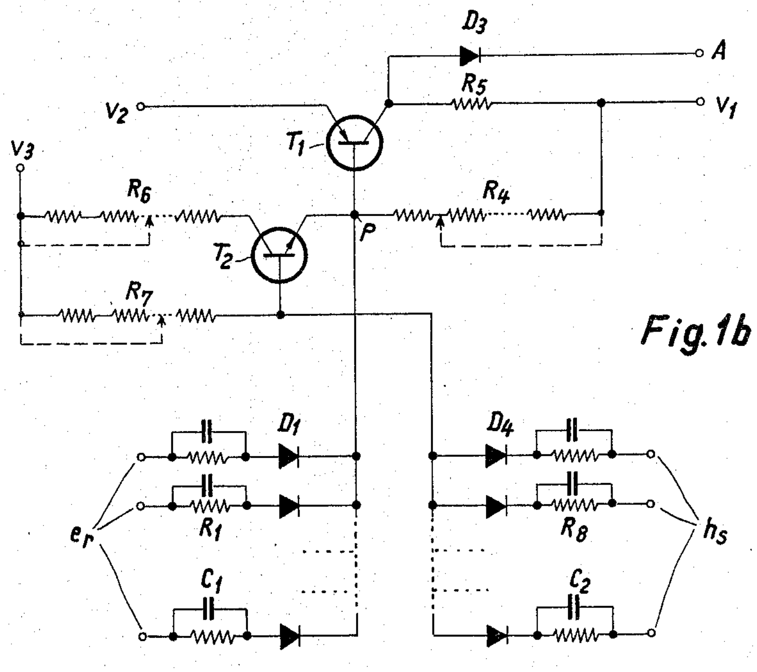

In the circuit of FIGURE 1*b* three D.C. voltages $V_1$, $V_2$, and $V_3$ are applied with $V_3>V_2>V_1$. The restraining action in this case is obtained by cutting off transistor $T_2$, which is of the n-p-n type. It will be assumed that transistor $T_2$ is first in the conducting condition. Similarly as in the circuit of FIGURE 1*a*, the resulting potential at point *p*, and thus at the base of the p-n-p transistor $T_1$, is so adjusted that it is more negative than $V_2$ and retains transistor $T_1$ conducting as long as no regular input $e_r$ has a potential $>V_2$, or an L signal. The potential at point *p* is formed by the voltage from source $V_1$ through the series resistors $R_4$ acting jointly with the voltage of source $V_3$ via the series of rheostats $R_6$, which may be varied in stepwise manner by using, for example, the adjustable tap shown in dashed lines it being remembered that at this point transistor $T_2$ is conducting. This voltage may be varied by connecting resistors $R_4$ and $R_6$ into or out of the circuit. As in the embodiment of FIGURE 1*a*, this potential determines a threshold $a_1$. This threshold indicates the number of regular inputs $e_r$ which must be provided with an L signal of potential in order to raise the potential of the base of transistor $T_1$ to the point where transistor $T_1$ changes into the blocking condition and the output at A changes from a O signal to an L signal.

However, if transistor $T_2$ is placed into blocking condition and does not conduct, then the more positive component which created the potential at point *p* is omitted and the base of transistor $T_1$ is now controlled to be negative to a larger extent by $V_1$ acting through resistors $R_4$ alone. This control toward a more negative potential results in a threshold value $a_2$ being formed. This means that more of the regular inputs $e_r$ than before must be controlled to be made positive in order to block the transistor $T_1$ and to produce the output at A equal to a signal L. The value of this threshold may be varied by switching resistors $R_4$ into or out of the circuit.

Normally transistor $T_2$ is retained in a conducting condition due to a positive potential disposed at its base from $V_3$ by means of the series connection of rheostats or resistors $R_7$. A plurality of diodes $D_4$ are connected in parallel, and the anodes of these diodes are also connected to the base of transistor $T_2$. The cathodes of diodes $D_4$ are connected through resistors $R_8$ to the restraining input lines $h_s$. A number of capacitors $C_2$, each of which is in parallel with a resistor $R_8$, serves to expedite the switching.

The potential equal to the O signal for the restraining input lines $h_s$ is sufficiently positive to retain the diodes $D_4$ in a backward biased condition. By applying a more negative potential equal to the signal L, which is smaller than the potential $V_2$, to the restraining input lines $h_s$, the diodes $D_4$ become conducting and the base potential for transistor $T_2$ may be lowered to the point where transistor $T_2$ changes over into the blocking or non-conducting condition. The threshold value *b* at which this occurs, or the number of restraining input lines to which a negative signal L must be applied in order to block the transistor $T_2$, is variably adjustable by means of resistors $R_7$ which may be connected into or out of the circuit for example by using the adjustable tap shown in dashed lines to thus vary the degree of positive control upon the base of transistor $T_2$.

Figure 2:
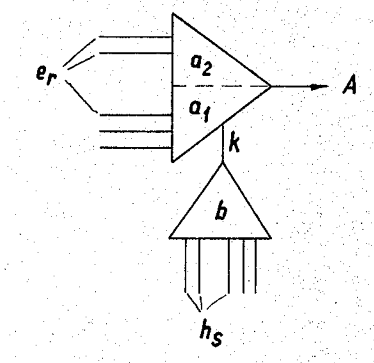
FIGURE 2 is a block diagram illustrating the circuits of FIGURES 1*a* and 1*b*.

A circuit which is arranged to act in the above described manner may be represented according to the block diagram illustrated in FIGURE 2. A main triangle representing the main connection with the logical output A has a plurality of regular or exciting input $e_r$, in which $r=1, 2 \ldots m$, connected to the base of this triangle. A secondary triangle is also provided, at the base of which the restraining input lines $h_s$, where $s=1, 2 \ldots n$, are connected. The output *k* leads into the main triangle.

The output *k* from the secondary triangle sets the effective threshold value designated by $a_2$. The threshold value $a_1$ is the threshold value which is opposed to the regular inputs $e_r$ when the restraining output *k* is inactive or ineffective. The threshold value *b* is the threshold value which must be overcome by the restraining input lines before an output will appear in *k* which switches in the threshold value $a_2$. Such an arrangement has been termed a neuron-like element since it is similar to neurons which are known in physiology and wherein similar conditions take place. When restraining input lines play a part, the connections have been termed neuron-like elements.

Figure 3:
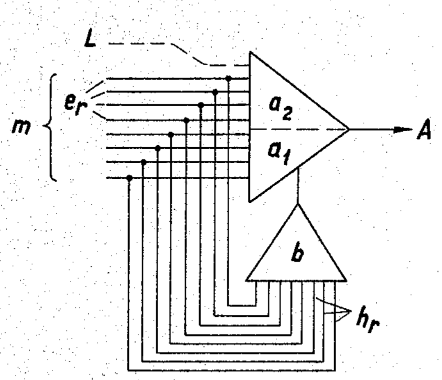
FIGURE 3 is a block diagram illustrating one type of connection for the circuit of FIGURE 2.

According to a further embodiment of the invention, interesting effects of such a neuron circuit may be obtained by connecting the regular inputs and the restraining input lines with one another by connecting them to a common logical input. This is illustrated in FIGURE 3 using the neuron circuit of FIGURE 2 with each of the regular inputs connected with one restraining input line. A regular input $m+1$ is indicated in dashed lines and may continuously carry a signal L. This may be additionally provided if a connection is desired which results in signal L if all of the inputs have a signal O.

Figure 4:
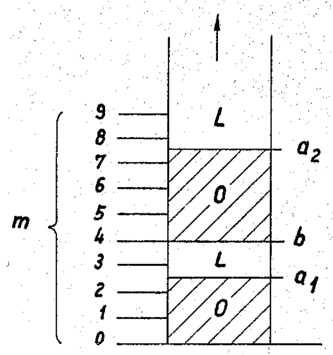
FIGURE 4 is a diagram illustrating the threshold relationships.

The diagram of FIGURE 4 conceptually illustrates the connections which may be obtained. On the left, lines of a scale indicate the number of inputs carrying an L signal. The lower threshold value $a_1$ must be surpassed before an L signal will appear in the output. Surpassing of the restraining threshold value $b$ sets the second threshold value $a_2$, above which only an L signal can appear in the output. With reference to this diagram, the types of arrangements and connections which may be achieved by variations of the thresholds may be recognized. The threshold values $a_1$ and $a_2$, respectively, will be termed threshold "$n$" when they are disposed between $n$ and $n+1$. Threshold value $b$ becomes active immediately upon reaching the level $n$. A lower threshold value $a_1>0$ will have meaning only if it is disposed more than one unit below the threshold value $b$ as well as $a_2$. With the threshold values indicated in FIGURE 4, an output signal L will result only if 3, 8, or 9 inputs carry an L signal. If the threshold value $a_2$ is raised to 9, a signal L results only if three inputs carry an L signal. If the threshold value $a_1$ is, for example, placed at O and the threshold value $a_2$ is adjusted so that $a_2=b=n$, and if the input $m+1=L$ is made active, the output signal O results only if $n$ number of inputs carry L signals. In the case where $n=m$, this is the negated AND-circuit.

The following table indicates further possibilities which may be obtained. The first column indicates the threshold values and also indicates when the input $m+1=L$ is present. The second and third columns indicate when the output signal O or L results, with $x$ being the number of inputs carrying an L signal. Row 1 corresponds to the diagram illustrated in FIGURE 4. In rows 2 through 7 a few special cases are set forth resulting in known types of circuits, which are indicated in the fourth column. However, these are only a few specific possibilities of the many which can be obtained.

Figure 5:
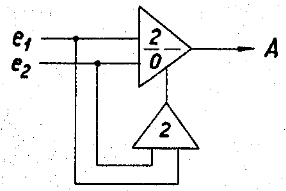
FIGURE 5 is a block diagram of another connection for the circuit of FIGURE 2.

FIGURE 5 indicates a block diagram arrangement for the neuron circuit for row 7. In this connection, if both inputs $e_1$ and $e_2$ carry an O signal then an O signal will also appear in output A. If one of the inputs carries an O signal and the other an L signal, then an L signal will appear at the output. If both inputs carry an L signal then the threshold $b=2$ has been attained and the restraining function is switched in, in this case by means of a conjunction AND-circuit as of the type indicated in FIGURE 1*a*, for example. This changes the threshold value of $a_1=O$ to the threshold $a_2=2$ so that the two L signals cannot produce an output L signal and the result is then an O signal. Thus, the result of this connection is $(O, O)=O$; $(O, L)=L$; $(L, O)=L$; $(L, L)=O$, which is termed an exclusive OR-circuit.

Row 3 of the table indicates an $n$ out of $m$ connection which will result in an output signal of L only if $n$ out of $m$ inputs are excited. It may be noted that it is of particular importance for testing data coded in an $n$ out of $m$ or $$\binom{n}{m}$$

code. It may be seen that by extending the region between thresholds $a_1$ and $b$, see FIGURE 4, codes of the form $$\binom{n,\ n+1,\ n+2,\ \ldots\ n+r}{m}$$

where $n+r<m$, may also be used. Considering the diagram of FIGURE 4, it may be seen that for each logical output function which may be created by applying an upper threshold $a_2$ which is greater than $m$,

| Rows ↓ | Columns→ | O | L | |
|---|---|---|---|---|
| (1) | $a_1>0$, $b>a_1+1$, $a_2<m$ | $x \leqq a_1$; $b \leqq x \leqq a_2$ | $a_1<x<b$; $x>a_2$ | |
| (2) | $m+1=L$, $a_1=0$, $b=m$, $a_2=m+1$ | $x=m$ | $x<m$ | $\overline{\wedge}$ |
| (3) | $a_1=n-1$, $b=n+1$, $a_2=m$ | $x \leqq n-1$; $n+1 \leqq x$ | $x=n$ | $\binom{n}{m}$ n out of m |
| (4) | $a_1=0$, $b=2$, $a_2=m$ | $2 \leqq x$ | $x=1$ | ($1_m$) generalized exclusive OR |
| (5) | $m+1=L$, $a_1=0$, $b=1$, $a_2=m+1$ | $1 \leqq x$ | $x=0$ | Inversion (Negation) |
| (6) | $m=2$, $m+1=L$, $a_1=0$, $b=1$, $a_2=2$ | $x=1$ | $x=0$; $x=2$ | Equivalence |
| (7) | $m=2$, $a_1=0$, $b=2$, $a_2=2$ | $x=0$; $x=2$ | $x=1$ | Antivalence (exclusive OR) |

the complementary or NOT (inversion) function may be obtained by shifting the threshold $a_2$ to the former value of $b$, $b$ to the former value of $a_1$, and $a_1$ to zero. In the three regions which will then be provided, as shown in the diagram of FIGURE 4, the signal L is thus converted to an O signal and the O signal is converted to an L signal. Among others, a code of the form $$\binom{\overline{n},\ \overline{n+1},\ \overline{n+2},\ \ldots\ \overline{n+r}}{m}$$

may be provided. The four region diagram of FIGURE 4, which corresponds to row 1 of the table, may also be written as the function $$\binom{n+\nu,\ r+\rho}{m}$$

wherein $\nu$, $\rho=1, 2$, etc., and $r+\rho_{\max}=m$, $n+\nu_{\max}<r$.

Another arrangement which may frequently be used to advantage is one which is shown in FIGURE 1*a* wherein a flip-flop FF is disposed at one of the restraining input lines and is capable of entirely removing the restraining function of this section of the circuit or "unrestraining" the circuit. Thus, this may be considered to be an inhibiting input. In the circuit of FIGURE 1*a* such a flip-flop is connected to an $n+1$ diode $D_2$ which may provide a zero signal or an L signal depending upon its condition, with these signals defined in the same connection as is used in FIGURE 1*a*. In this case the conjunction AND-gate of the $n$ restraining input lines provides restraining only if the flip-flop also has an L signal. Otherwise, the entire restraining function is made ineffective and the circuit is unrestrained. The flip-flop is changed from one state to another by signals applied to its inputs $e_1$ and $e_2$. In one state or condition of the flip-flop its output delivers a more positive potential (equal to O) and in its other condition its output delivers a more negative potential (equal to L) to the diode.

With the circuit according to the invention it is also possible to interrogate the condition of a flip-flop without cancelling this condition. For this purpose the interrogating pulse appears at a regular exciting input connected with a restraining input line, while a second restraining input line is connected to the flip-flop, and the thresholds are adjusted so that $a_1=0$, $b=2$, $a_2 \geqq 1$.

Generally, each logical function may be represented as a polynomial in the disjunctive standard formula $$f=(X_{i_1}, X_{i_2}, X_{i_3} \ldots) \vee (X_{j_1}, X_{j_2}, X_{j_3} \ldots) \vee (\ldots) \vee (\ldots)$$

with the expressions in parentheses being called monomials. The functions which may be obtained by the neuron circuit are symmetrical for those variables which are applied both to the regular inputs and to the restraining inputs, because the variables are exchangeable. The diagram of FIGURE 4 permits representation of all possible combinations of symmetrical monomial functions disjunctively forming polynomials. The value of the differences $a_1-0$, $b-a_1$, $a_2-b$, and $m-a_2$, in each case determines the symmetrical disjunctive polynomial. This symmetry is not true for the regular inputs and restraining input lines which are not connected with each other.

In designing a logical circuit one would first determine the symmetrical part; the monomials connecting variables that become active either at the regular inputs only or at the restraining inputs only may be conjunctively connected with the symmetrical partial polynomial so that in each case according to the following $$\left[\binom{n}{m} \vee \binom{r}{m} \vee \ldots\right] \wedge [(\overline{m}_1 \ldots) \vee (\overline{m}_2 \ldots)]$$

where $m_V$ does not belong to this set of $m$, the complete polynomial is formed which represents the function to be generated.

In this connection one may use to advantage a further aspect of the present invention which has already been mentioned wherein individual logical inputs become active in several regular input lines or in several restraining lines, respectively, as shown, for example, in FIGURE 8. Values in accordance with rank or weight are assigned to the variables, namely, regular input ranks $g_e(x_1)$ as the number of regular inputs that are acted upon by the same signal $x_1$, and restraining ranks $g_h(x_1)$ as the number of inhibiting input lines which are acted upon by a single signal $x_1$.

The term "symmetry" in a Bolean polynomial is here defined as the case where a variable or a group of variables, always connected in the same manner, appear simultaneously in several monomials of the polynomial. A polynomial may then have several such symmetries and a symmetrical function such as, for example, $f$ $$(a, b, c)=a \vee b \vee c$$

may not have such a symmetry in the sense defined. If the condition $g_e(x_1)=g_h(x_1)$ is present for each variable $x_1$ of the function, this function is symmetrical. Its output is a function of meeting or not meeting the condition wherein of all the $m$ inputs, inputs $$\left(n+\nu, r+\rho, \overset{s}{m}+6 \ldots\right)$$

are affected by the same logical value or signal O or L, wherein $n<r<s \ldots <m$, $n, r, s=1, 2, 3 \ldots, V, \rho, 6=0, 1, 2 \ldots$. Now, when there is a non-symmetrical function with $v$ number of variables and $u$ number of symmetries, a linear equation system of $u$ equations with $v$ unknowns may be established with the ranks of each of the variables being considered the unknowns. These unknowns may be accurately or unquestionably determined for the case where $u \leqq v$, and making use of only one threshold. This one threshold is the lower one, while the restraining input lines do not have to be switched into the circuit.

If $u<v$, the given polynomial should be used, which may be written in non-redundant disjunctive standard form, i.e., if any one of the monomials appears in a longer one, then this longer one shall be cancelled. For example:

(1) $abc \vee be \vee ce \vee de \vee abce \vee bde = abc \vee be \vee ce \vee de$ The monomial may also consist of a single variable insofar as the signal or value L of the variable should be sufficient to give the value L to the entire function. For example:

(2) $abc \vee be \vee ce \vee d$ ($d$=monomial)

At the same time a conjunctive polynomial should be taken consisting of all monomial combinations of the same variables which are not permissible. For example:

(3) $\overline{abd} \wedge \overline{acd} \wedge \overline{bcd} \wedge \overline{ae}$ for $abc \vee be \vee ce \vee de$ If a monomial, in this new polynomial, is contained in another longer one, the shorter one is to be cancelled. For example:

(4) $\overline{abd} \wedge \overline{acd} \wedge \overline{bcd} \wedge \overline{ab} \wedge \overline{cd} = \overline{abd} \wedge \overline{acd} \wedge \overline{bcd}$ This new polynomial may be minimized by the law of distribution to a disjunctive form. For example:

(5) $\overline{abd} \wedge \overline{acd} \wedge \overline{bcd} \wedge \bar{a}\bar{e} = \overline{d(ab \vee ac \vee bc)} \wedge \overline{ae}$ A factor of the monomials in this polynomial may appear at the same time in monomials in the first polynomial. In this case, these monomials in the first polynomial, which monomials shall be referred to as dependent ones, shall be separted from the remaining independent ones. Now, for the sake of simplicity, each variable shall be taken instead of its rank $g_e$, and each monomial shall be represented as an equation wherein the variables appearing therein are added. For each independent monomial, the following must hold true, for example, in the case of the function $abc \vee be \vee ce \vee de$:

$$a+b+c \geqq a_1$$
$$b+e \geqq a_1$$
$$c+e \geqq a_1$$

For each dependent one, the following must hold:

$$d+e \geqq a_2$$

For each monomial of the non-minimized conjunctive polynomial (non-permissible combinations) the following must hold:

$$a+b+d \leqq a_{2-1}$$
$$a+c+d \leqq a_{2-1}$$
$$b+c+d \leqq a_{2-1}$$
$$a+e \leqq a_{2-1}$$

A system of equations is thus obtained by which, through the insertion of certain assumed values for definite variables, a solution is provided if the number of unknowns is larger than that of the equations. In order to increase the number of the equations, we may additionally include the symmetries. Assuming that the disjunctive factors of the different symmetries do not all possess the same number of variables, we chose those factors that show the maximum number of variables.

In (6) $b(ac \vee e)$; $c(ab \vee e)$; $e(b \vee c \vee d)$ for $abc \vee be \vee ce \vee de$ for example, they all have 3 variables each. These factors may then again be represented as equations of the form $$a+c+e \leqq a_{1-1}$$
$$a+b+e \leqq a_{1-1}$$
$$b+c+d \leqq a_{1-1}$$

resulting in the additional equation $$a_1 \geqq 4$$

on the assumption that each of the variables at least has the rank 1. In the above group of three equations, the variables are again to be considered as excitation ranks. All previous equations are to be combined as a system and are to be solved. The excitation ranks and excitation thresholds are to be found in this manner.

For the monomials of the minimized conjunctive polynomial, for Example 5, the conjunctive factors may again be represented as algebraic equations. In this case, we shall now assume $x'=g_h(x)$. Then the following must hold:

$$a'+e'\geqq b$$
$$d'\geqq b$$

($b$=restraining threshold)

On the assumption that each variable has at least the rank of 1, the following holds: $b\geqq 2$. The last three relations are to be considered as a system of equations and are to be solved. These solutions yield the restraining ranks and the inhibition threshold.

With the function $f(a, b, c, d, e)=abc \vee be \vee ce \vee de$, considered, the following is obtained: $g_e(a)=2, g_h(a)=1, g_e(b)=1, g_h(b)=0, g_e(c)=1, g_h(c)=0, g_e(d)=2, g_e(e)=3, g_h(e)=1$, threshold $a_1=4$, threshold $a_2=6$, threshold $b=2$. The corresponding circuit is shown in FIGURE 6.

According to the foregoing, the logical network according to the invention has properties that make it most suitable to be used as modulus (namely, as an element with variable connection effects) in communication processing or controlling systems. In this context, it is of great advantage that, as may be seen from the mode of operation of the circuits, it handles the connection in one cycle. As the last example of application, the building up of a binary adding stage out of connecting elements according to the invention will be considered. If $x$ and $y$ are two binary digits to be added, $Tr_{i-1}$ a transfer or carry to be considered from the next lower digit, R the resulting digital value, and $Tr_i$ a resulting transfer, then the Truth table reads as follows:

| $x$ | $y$ | $Tr_{i-1}$ | R | $Rr_i$ |
|---|---|---|---|---|
| L | L | L | L | L |
| L | L | O | O | L |
| L | O | L | O | L |
| O | L | L | O | L |
| L | O | O | L | O |
| O | L | O | L | O |
| O | O | L | L | O |
| O | O | O | O | O |

Thus, the output for R has to receive an L signal *if* of the inputs $x$, $y$, $Tr_{i-1}$ one or three are excited, and the output for $Tr_i$ has to receive an L signal if two or three inputs are excited. The connection according to FIGURE 7 performs the desired task, as will readily be realized by checking this figure with the above illustrations.

It will be understood that the above description of the present invention is susceptible to various modifications, changes, and adaptations, and the same are intended to be comprehended within the meaning and range of equivalents of the appended claims.

What is claimed is:

1. A logical circuit comprising, in combination:
(a) a regular input section having a plurality of regular inputs;
(b) a restraining input section having a plurality of restraining inputs;
(c) a regular output section connected with said regular input section and having an output signal in response to a predetermined number of energized regular inputs from said input section; and
(d) an output varying section connected with said restraining input section and said regular output output section for rendering the regular output section responsive to a different number of energized regular inputs.

2. A logical circuit device, comprising in combination: a regular input section having a plurality of signal activated regular inputs; an output section having a first element responsive to said signals and being connected to said regular input section, said first element having two ranges of threshold values for determining the number of activated regular inputs needed to cause said output section to have an output signal, and variable means connected to said first element for establishing the range of the first threshold value, and additional means connected to said first element for changing the magnitude of the threshold value to establish the range of the second threshold value and including a second element responsive to input signals and having a control input; and a restraining input section connected to said control input for changing from the first to the second threshold value.

3. A logical circuit device comprising, in combination:
(a) a regular input section having a plurality of regular inputs,
(b) a restraining input section having at least one restraining input;
(c) an output section connected with said regular input section and having an output signal in response to a predetermined number of activated regular inputs from said regular input section, said output section having two threshold values for determining the number of activated regular inputs needed to provide an output signal and including means for establishing the magnitude of the first of the two threshold values; and
(d) an output varying section connected with said restraining input section and said output section for changing, in response to the number of activated restraining inputs, the threshold value of said output section from the first to the second of said two threshold values and including means for establishing the mangnitude of the second threshold value.

4. A circuit as defined in claim 3, wherein at least one restraining input is connected with a regular input to form a common logical input to said circuit.

5. A logical circuit as defined in claim 3, wherein said restraining input section includes an inhibiting input which when activated cancels the restraining effect of the output varying section.

6. A logical circuit as defined in claim 3, wherein said restraining input section includes a plurality of restraining inputs and comprising individual logical inputs arranged to become active in several regular inputs and in several restraining inputs.

7. A logical circuit as defined in claim 3, wherein said regular input section includes a further regular input which constantly is provided with a logical signal equal to L for connecting into the circuit to provide a logical output signal L when all inputs have a logical signal O.

8. A logical circuit as defined in claim 3, wherein said regular otuput section includes a switching element for switching from a first state of conductivity into a second state to change the output thereof and current acting to switch this element into the first state may be counteracted by the excitation of at least one input of the regular input section to switch the element into the second state, and said output varying section includes a second switching element for varying said current, said second element being controlled by the excitation of at least one input of the restraining input section.

9. A circuit as defined in claim 8, comprising a combination of resistors in said regular output section and said output varying section and variable means for connecting the desired number of resistors to vary the amount of current necessary to change the conditions of said switching elements.

10. A circuit as defined in claim 8, wherein said first and second switching elements are first and second transistors respectively.

11. A circuit as defined in claim 10, wherein the regular input section controls the base of said first transistor, and the restraining input section controls the base of said second transistor.

12. A device as defined in claim 3, wherein there are a plurality of restraining inputs and said output varying section including means for establishing tthe magnitude of a third threshold value for determining the number of activated restraining inputs needed to change the threshold value of said output section from the first to the second of said two threshold values.

13. A device as defined in claim 3, wherein there are a plurality of restraining inputs connected as a logic gate, the output of said gate being connected to control said output varying section.

14. A device as defined in claim 3, wherein said output section includes a first transistor, a source of operating voltage, a resistance including a first plurality of series-connected resistors means for connecting a desired number of resistors of said first plurality of resistors between the base of said first transistor and the source of operating voltage to apply operating voltage to the base of said transistor, each regular input being connected to said base and including a resistor and a rectifier to which a voltage which acts against the operating voltage can be applied, said output varying section including a second transistor having its emitter-collector path connected to the base of said first transistor and being connected to be controlled by said restraining input section and a further resistance including a second plurality of series-connected resistors, and means for connecting a desired number of resistors of said second plurality of resistors in the emitter-collector path of said second transistor, whereby the switching voltage of the first transistor is controlled by the switched condition of said second transistor.

15. A device as defined in claim 14, wherein said output varying section further includes a further resistance including a third plurality of series-connected resistors, means for connecting a desired number of resistors of said third plurality of resistors with the base of said second transistor and the source to apply switching-in voltage for the second transistor, each restraining input being connected to the base of said second transistor and including a resistance and a rectifier to which a voltage which acts against the switching-in voltage can be applied.

References Cited by the Examiner

UNITED STATES PATENTS

| | | | |
|---|---|---|---|
| 2,843,837 | 7/1958 | Thaler | 307—88.5 |
| 3,050,642 | 8/1962 | Rogers et al. | 307—88.5 |
| 3,155,841 | 11/1964 | Okuda | 307—88.5 |

DAVID J. GALVIN, *Primary Examiner.*